June 3, 1969
A. E. HOCHSTEIN
3,448,336
POWER CIRCUIT FOR GAS FILLED ARC LAMP
Filed Oct. 20, 1965
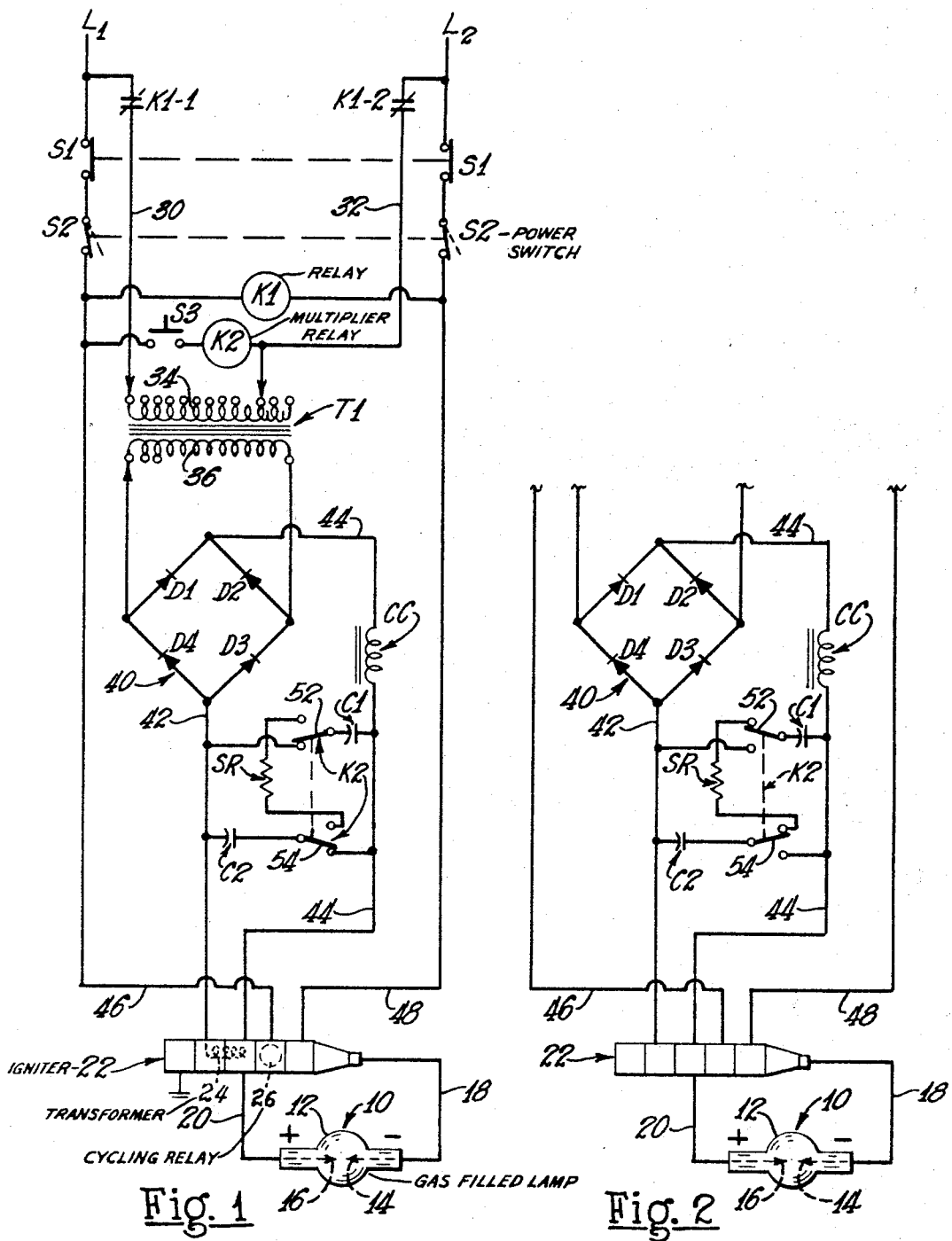
INVENTOR.
ALEXANDER E. HOCHSTEIN
BY
Harry O. Ernsberger
ATTORNEY

United States Patent Office 3,448,336
Patented June 3, 1969

3,448,336
POWER CIRCUIT FOR GAS FILLED ARC LAMP
Alexander E. Hochstein, Toledo, Ohio, assignor to The Strong Electric Corporation, Toledo, Ohio, a corporation of Delaware
Filed Oct. 20, 1965, Ser. No. 498,446
Int. Cl. H05b 39/04, 41/14, 41/24
U.S. Cl. 315—176                                9 Claims

ABSTRACT OF THE DISCLOSURE

The disclosure embraces a power circuit for a gas-filled lamp, the circuit embodying relay means in conjunction with capacitors controlled by the relay means to provide an increased voltage applied momentarily to effect gas ionization and establishment of the arc and thereafter providing direct current of low voltage for normal arc operation.

---

This invention relates to a power circuit for a gas filled arc lamp and more especially to a power circuit for operation of a gas filled arc lamp and to a method of initiating operation of or igniting an arc lamp of this character.

Power circuits have been used for energizing closed envelope arc lamps in an inert gas environment which involve special components for ignition or starting of the bulb where different voltages are required for igniting the lamp or establishing an arc from the normal operating voltage of the lamp after ignition is completed. In establishing an arc in a lamp of the sealed envelope type in an environment of xenon gas, a comparatively high direct current voltage and a very high alternating current voltage or pulse are required. After establishment of the arc a low voltage direct current is utilized for maintenance of normal lamp operation.

Heretofore in order to effect the high current voltage for establishing the arc, it has been conventional to employ a transformer rectifier utilizing a high reactance transformer having a high voltage secondary for the purpose, but a transformer of this character has a comparatively low power factor. This system of starting and maintenance of lamp operation is comparatively costly by reason of the use of the secondary transformer which, while enabling the ignition of the lamp, is inefficient in its functioning.

The present invention embraces a power circuit and method utilizing capacitors for obtaining the increase in direct current voltage required for establishing an arc in a gas-filled arc lamp without the use of an auxiliary high voltage source.

Another object of the invention resides in a power circuit for an enclosed gas-filled arc lamp embodying a simple, yet effective, relay or switch means in conjunction with capacitors arranged to provide increased direct current voltage applied momentarily to effect completion of a high voltage circuit to effect gas ionization and establishment of the arc in the lamp and thereafter providing direct current of low voltage for mainntenance of normal arc operation.

Another object of the invention resides in a power supply and control circuit for a gas filled arc lamp wherein capacitors are oriented in series relation to provide an increased direct current voltage for ignition of the lamp and reorienting the capacitors in parallel relation to provide a reduced direct current voltage for normal lamp operation.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a schematic diagram of the power and control circuit of the invention for a gas filled arc lamp showing the components in positions for normal lamp operation after establishment of the arc, and FIGURE 2 is illustrates the positions of the components in establishing the arc.

While the circuit arrangement illustrated in the drawings is particularly adaptable for ignition and control of a closed envelope arc lamp wherein the envelope is filled with xenon gas, it is to be understood that the power and control circuit may be employed for ignition and control of gas-filled arc lamps employing other gases such as neon, argon or similar gases.

Referring to the circuit diagram, FIGURE 1, a xenon lamp of conventional character is indicated at 10 and includes a transparent envelope 12 filled with xenon gas, the lamp having a negative electrode 14 and a positive electrode 16 arranged in spaced relation to provide for the establishment of an arc between the electrodes.

Current conductors 18 and 20 are connected respectively with the negative and positive electrodes 14 and 16, the electrodes being sealed in the envelope to provide a gas-filled sealed lamp. The conductors 18 and 20 are connected with an igniter instrumentality 22 which is of conventional construction.

The igniter 22 includes a high voltage transformer 24 and an internal relay 26 providing a high voltage alternating current pulse in the lamp 10 for initiating operation of the lamp, the high voltage breaking down or overcoming the resistance of the xenon gas in the bulb 12 to effect current flow between the electrodes 14 and 16.

FIGURE 1 illustrates the power supply circuit and components for effecting the energization of the igniter or arc establishing instrumentality 22 and for maintaining proper direct current voltage to effect continued operation of the lamp 10. Conductors L1 and L2 are connected with a conventional current supply such as 120 volt or 240 volt 60 cycle alternating current. The power supply leads are connected with contacts K1–1 and K1–2 of a relay K1, the contacts being normally open. An interlock switch S1 is arranged to be actuated by a movable door for a housing (not shown) enclosing the lamp construction 10 whereby when the lamp access door is closed, the interlock switch S1 is closed.

A power switch S2 is in series with the switch S1 and the closing of power switch S2 energizes the relay K1 to close contacts K1–1 and K1–2 and thereby supply alternating current through conductors 30 and 32 to the primary coil 34 of a transformer T1. The secondary coil 36 of transformer T1 is connected with a solid state bridge rectifier 40 which embodies diodes D1, D2, D3 and D4 and which rectifies or converts the alternating current voltage from the secondary coil 36 of the transformer T1 to a pulsating direct current in the rectifier output conductors 42 and 44. A choke coil CC functions to smooth out the pulsations or ripples in the direct current output of the rectifier.

In the power supply and control circuit for the xenon lamp 10 capacitors in combination with switch means are adapted to multiply or amplify the direct current output voltage from the rectifier for the purpose of igniting the lamp. Alternating current is supplied by conductors 46 and 48 to the high voltage transformer 24 in the igniter unit 22 through the internal relay 26 in the igniter unit. The output from the secondary 36 of the transformer T1, which may be approximately fifty volts, provides for direct current output of substantially the same voltage from the rectifier 40. The direct current conducted through conductors 42 and 44 supplies the normal operating voltage for the xenon lamp 10 after the arc has been established.

In order to establish ignition of the xenon lamp 10, it is essential to increase the direct current voltage to about 100 volts to initiate operation of the relay to energize the high voltage transformer to ignite the lamp. As shown in FIGURE 1, two capacitors C1 and C2 are adapted by suitable switch or relay means to be intercalated in the output circuit of the rectifier 40 to obtain approximately 50 volts for normal lamp operation, and obtain approximately 100 volts for lamp ignition.

Associated with the capacitors C1 and C2 is a double pole double throw relay or switch means K2 which is normally positioned so that the movable contacts 52 and 54 thereof are in the position shown in FIGURE 1, connecting the capacitors C1 and C2 in parallel relation across the direct current output from the rectifier 40. In this position of the relay K2, the direct current voltage of about 50 volts supplied from the rectifier through the igniter instrumentality 22 provides for normal lamp operation after ignition.

A surge resistor SR is adapted to be oriented in the circuit of the capacitors when the increased voltage output is desired and which is obtained through a series arrangement of the capacitors C1 and C2. A switch S3, which may be a push button switch, is adapted to be manually actuated or may be actuated by conventional automatic means to establish the arc or ignite the xenon lamp 10.

The capacitors C1 and C2 are in fully charged condition when connected in parallel with respect to the direct current output from the rectifier 40. Manual closing of the switch S3 energizes the multiplier relay K2, shifting the position of the movable contacts 52 and 54 to connect the capacitors C1 and C2 in series through the surge resistor SR.

Each capacitor voltage has a charge of approximately 50 volts, and when connected in series, provides an increased voltage output. The increased voltage output viz about 100 volts in the conductors 42 and 44 energizes the internal relay in the ignition unit 22, closing the primary circuit of the transformer in the igniter unit to induce an alternating current pulse of high voltage which is imposed on the negative electrode 14 to establish the arc or ignite the lamp.

The arc establishing voltage, for example, may be between 25,000 and 50,000 volts, sufficient to ionize the xenon gas in the bulb and establish current flow between the electrodes 14 and 16. When the bulb has been ignited, switch S3 is opened and relay K2 reconnects the capacitors C1 and C2 in parallel relation across the rectifier output. By this action the direct current voltage to the lamp 10 is reduced to its operating voltage maintaining continuous operation of the lamp.

FIGURE 2 illustrates the position of the double pole-double throw relay K2 for initiating ignition of the xenon lamp 10 when the switch S3, shown in FIGURE 1, is closed.

In the position of the relay K2, shown in FIGURE 2, the capacitors C1 and C2 are connected in series with the surge resistor SR in the circuit. The fully charged capacitors when connected in series, increase the direct current voltage to energize the relay in the igniter. The high voltage alternating current pulse from the ignition transformer breaks down the gas in the xenon bulb and establishes the arc.

The operation of the components for igniting the gas filled lamp 10 is as follows: Alternating current is supplied to the conductors L1 and L2. The lamp 10 is usually disposed within a housing (not shown) provided with an access door (not shown) equipped with an interlock switch S1 which is closed when the access door is closed. The operator closes the power switch S2 energizing the relay K1 closing the contacts K1–1 and K1–2 to supply alternating current to the primary coil 34 of the transformer T1. The alternating current supply may be either 120 volts or 240 volts.

The transformer T1 is a so-called "step down" transformer, the secondary coil 36 of which has a lesser number of turns than the primary 34, inducing a lower voltage in the secondary 36. The alternating current output of the secondary 36 is fed to the solid state bridge rectifier 40 which rectifies the alternating current voltage to a pulsating direct current voltage in the output conductors 42 and 44, the pulsating direct current being smoothed out by a choke coil CC.

As shown in FIGURE 1, the capacitors C1 and C2 are in parallel relation through the position of the double pole double throw relay switch K2 and are fully charged. The capacitors C1 and C2 provide additional filtering or smoothing out of ripples or pulsations of the rectifier output.

The closing of the power switch S2 establishes a circuit through conductors 46 and 48 to the internal relay for controlling a high voltage ignition transformer, both being components of the igniter instrumentality 22, the internal cycling relay being normally open, being energized by closing switch S3. The operator closes the manually operable switch S3 to initiate ignition of the lamp 10. The closing of switch S3 energizes the relay K2 which moves to lamp igniting position shown in FIGURE 2. The relay K2 places the capacitors C1 and C2 in series relation with the surge resistor SR in the circuit.

The placing of the capacitors C1 and C2 in series relation doubles the voltage of the direct current in the circuit of the cycling relay in the igniter 22. The increased voltage of the direct current output energizes the cycling relay, closing the primary alternating current circuit to the transformer in the igniter instrumentality 22 to provide a high voltage pulse to the lamp electrodes 14 and 16. The high voltage pulse effects the ionization of the xenon gas, establishing an arc between the electrodes 14 and 16.

At the instant the arc is formed between the electrodes 14 and 16, the relay in the igniter instrumentality 22 is de-energized due to the voltage drop of the direct current through the electrode circuit under the high current flow through the electrodes. Thus, the danger of extremely high voltage in the electrode circuit after the bulb is ignited is eliminated because the internal relay in the igniter instrumentality 22 automatically denergizes the high voltage transformer in the igniter instrumentality 22.

Upon establishment of the arc or ignition of the lamp 10, the switch S3 is opened, either manually or automatically, which de-energizes the relay K2, re-establishing the connection of the capacitors C1 and C2 in parallel relation, as shown in FIGURE 1, reducing the voltage of the direct current to normal operating voltage in the electrode circuit of the xenon lamp 10, and this voltage maintained during normal lamp operation.

Typical values for components of the control circuit are as follows: For example, the direct current output from the rectifier 40 with the capacitors C1 and C2 arranged in parallel may be in the order of approximately 50 volts, as the "step down" transformer is adapted to reduce the line voltage to the desired input for the rectifier 40. During ignition of the lamp, with capacitors C1 and C2 connected in series as shown in FIGURE 2, the direct current voltage to the igniter instrumentality 22 and to the lamp electrodes is approximately doubled.

The high voltage developed by the high voltage transformer in the igniter instrumentality 22 may be from about 25,000 volts to 50,000 volts or of other voltage sufficient to cause ionization of the xenon gas in the lamp 10 in order to establish an arc across the electrodes 14 and 16 to provide an ionized gas path for direct current flow. The capacitors C1 and C2 are of high value, each being of a capacity of about 13,000 microfarads, but may be varied dependent upon capacity of the lamp.

The system and circuit of the invention eliminate the need for a high voltage secondary transformer which has heretofore been employed for energizing a relay of an igniter and provides for more efficient operation because such transformer has a high reactance and a low power factor. Applicant's arrangement provides for a multiple position of capacitors in the circuit for increasing the direct current voltage for ignition purposes and a reduced voltage for maintenance of the arc. It is to be understood that if a higher starting voltage is desired, more capacitors of the character of C1 and C2 may be employed with a suitable relay K2 for connecting the capacitors in series for lamp ignition purposes and in parallel for normal bulb arc operation.

I claim:
1. A circuit for establishing an arc between electrodes in a gas-filled lamp and maintaining the arc comprising a gas-filled lamp, a rectifier means, a transformer supplying the rectifier means with alternating current, said rectifier means providing direct current output, an ignition instrumentality supplied with alternating current to provide a high voltage output to the electrodes of the lamp for establishing the arc, said direct current output being conducted to said ignition instrumentality for actuating means to establish the high voltage output to the electrodes to establish the arc and for normal lamp operation, a plurality of capacitors, relay means associated with the capacitors, switch means for energizing said relay means to one position to connect the capacitors in series relation across the direct current output to supply an increased voltage for actuating the means to estabish the high voltage for igniting the lamp, said relay means being movable to a second position upon deactivation of the switch means to connect the capacitors in parallel relation to provide direct current of reduced voltage for normal operation of the lamp.

2. A circuit according to claim 1 wherein the rectifier means is a solid state bridge rectifier.

3. A circuit according to claim 1 wherein a surge resistor is intercalated in series relation with the capacitors when the capacitors are arranged in series relation by the relay means.

4. A circuit according to claim 1 wherein energization of the relay means for connecting the capacitors in series relation is initiated by a manually controlled switch means.

5. A circuit according to claim 1 wherein a choke coil is intercalated in the output circuit of the rectifier to reduce the amplitude of pulsations in the direct current output.

6. A circuit according to claim 1 wherein the lamp is filled with xenon gas.

7. A circuit for establishing an arc between electrodes in a gas-filled lamp to ignite the lamp and maintaining the arc comprising a gas-filled lamp, a transformer for connection with a supply of alternating current, rectifier means connected with the transformer output to provide direct current, a plurality of capacitors, an ignition instrumentality including a second transformer for connection with alternating current from a supply conductor to provide a high voltage output to establish an arc between the electrodes of the lamp to ignite the lamp, a first relay, conductors conveying direct current from the rectifier to said ignition instrumentality for actuating the first relay to connect the second transformer with alternating current supply to provide the high voltage alternating current to the electrodes, a plurality of capacitors, second relay means associated with the capacitors, and switch means for energizing said second relay means to one position to connect the capacitors in series relation across the direct current output to supply an amplified voltage for operating the first relay means for igniting the lamp, said second relay means being movable to a second position upon deactivation of the switch means to connect the capacitors in parallel relation to provide direct current of reduced voltage for normal operation of the lamp.

8. A circuit according to claim 7 wherein two capacitors are employed each being of a capacity of about 13,000 microfarads so that when connected in series relation result in substantially doubling the voltage of the direct current supplied to the ignition instrumentality.

9. A circuit according to claim 8 wherein the lamp is filled with xenon gas, and the switch means is manually operable for establishing an energizing circuit to said second relay means.

References Cited
UNITED STATES PATENTS

| | | | |
|---|---|---|---|
| 1,938,742 | 12/1933 | Demarest | 315—176 X |
| 2,411,848 | 12/1946 | Camras | 315—176 |
| 3,170,084 | 2/1965 | Retzer | 315—173 |
| 3,235,769 | 2/1966 | Wattenbach | 315—176 |

JOHN W. HUCKERT, Primary Examiner.

S. BRODIE, Assistant Examiner.

U.S. Cl. X.R.
315—163, 173, 200